July 28, 1959 R. R. STEPHENS 2,896,995
PIVOTALLY-MOUNTED MOORING HOOK
Filed July 17, 1956 2 Sheets-Sheet 1
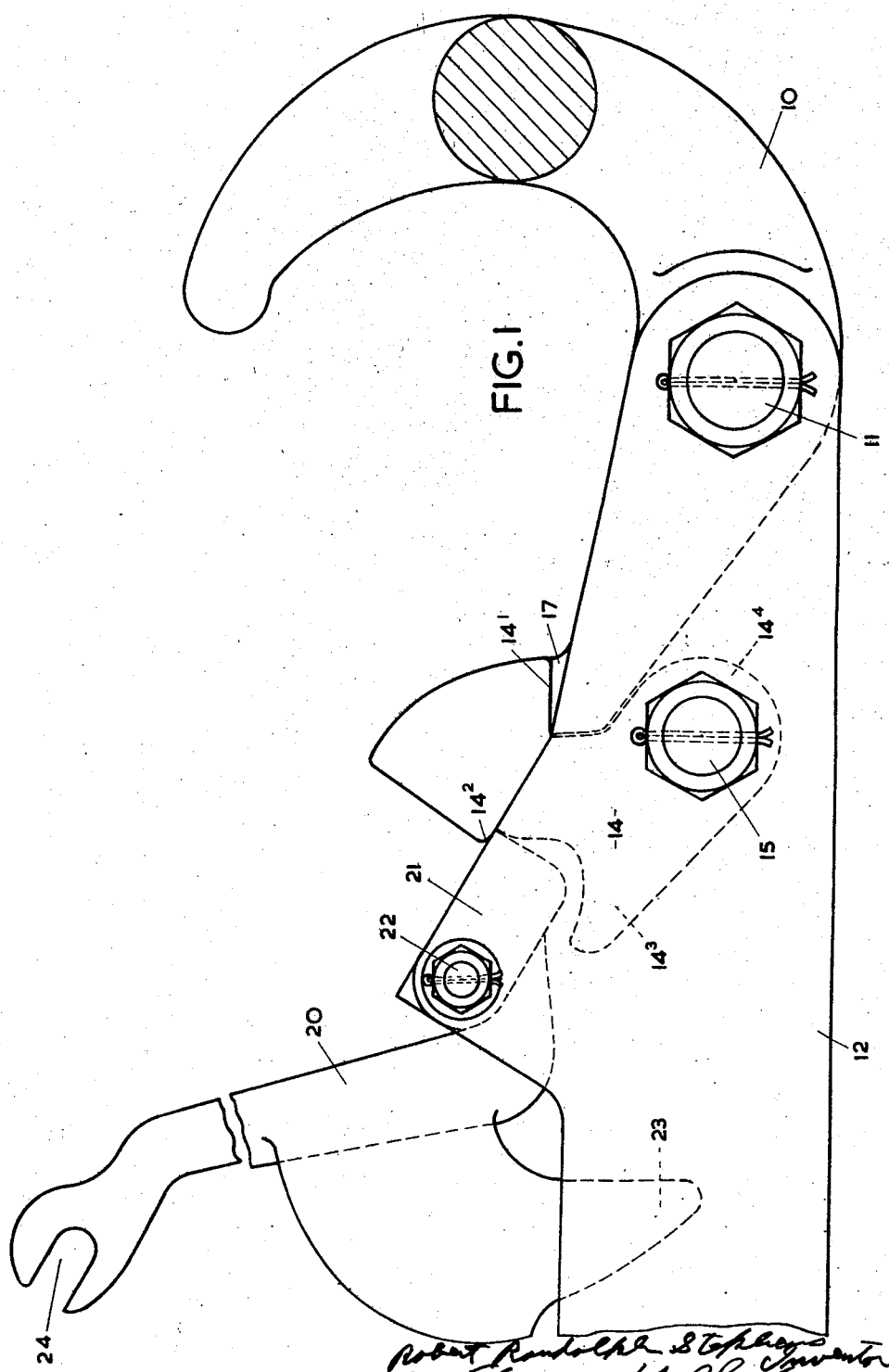

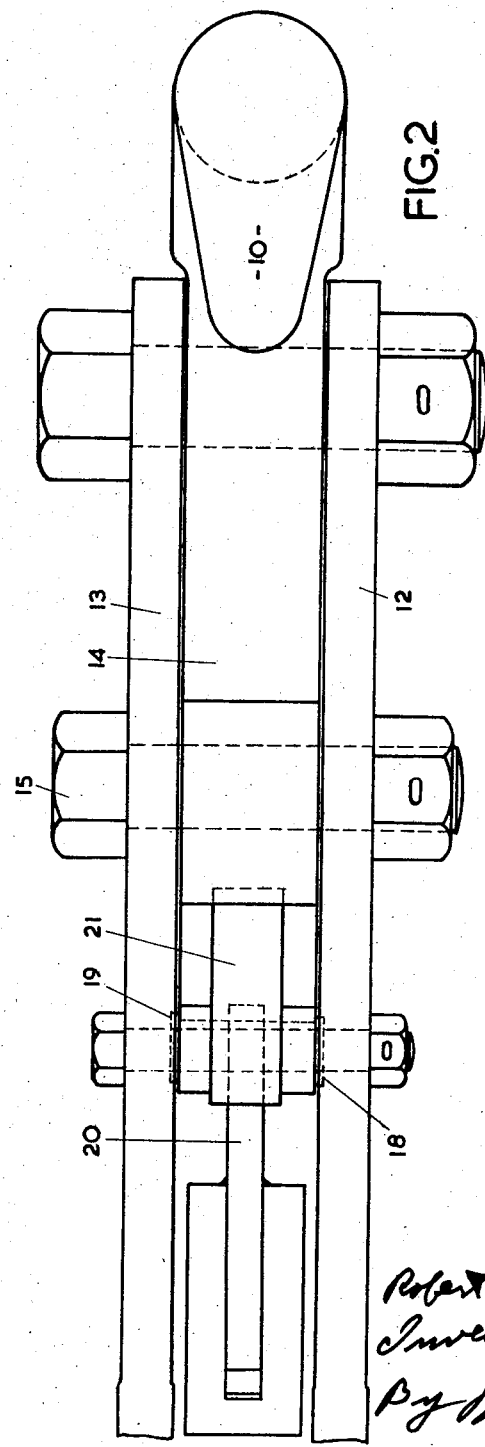

United States Patent Office 2,896,995
Patented July 28, 1959

2,896,995

PIVOTALLY-MOUNTED MOORING HOOK

Robert Randolph Stephens, London, England, assignor to The Monarch Controller Company Limited, London, England, a British company Application July 17, 1956, Serial No. 598,372

4 Claims. (Cl. 294—83)

This invention relates to pivotally mounted hooks of the kind in which the hook is locked in the operative position by a pivotally mounted latch, on release of which it drops around its pivotal mounting and releases a rope, cable or the like engaged with the hook. Hooks of this kind are used, for example, as mooring hooks and for attaching tow and haulage ropes, cables and the like.

Hooks of the above kind are known in which the pivotally mounted latch, in the locking position, engages the outer end of the hook and is retained in the locking position by a pin passing through the end of the hook. A disadvantage of this known construction is that the rope, cable or the like engaged in the hook cannot be released from a distance and an attendant is required in the vicinity of the hook to remove the retaining pin and lift the latch off the hook.

The object of the present invention is to overcome this disadvantage and to provide a hook of the kind above referred to from which the rope, cable or the like can be released from a distance.

With the foregoing object in view the present invention provides a device for locking a pivotally mounted hook in a substantially upright operative position in which it is to be engaged by one end of a cable or like member and for subsequently releasing the hook to enable it to drop around its pivotal mounting and thereby release said cable or like member, said device comprising a pivotally mounted two armed lever having a long arm and a short arm, a pivotally mounted latch operatively disposed between the inner end of the hook and the short arm of the lever, the pivotal mountings of said hook, lever and latch being parallel and the latch and hook having engaging hook retaining surfaces parallel to the axis of the pivotal mounting of the latch and substantially normal to a radius therethrough, in which the side of the latch adjacent the free end of the short arm of the lever has two spaced lever engaging surfaces between which the said free end of the short arm of the lever can move when the lever is turned on its pivotal mounting, the arrangement being such that the lever can be turned in one direction to press said free end of its short arm against one of said lever engaging surfaces and thereby turn the latch into and hold it in a locking position in which it locks the hook in position, and in the opposite direction to press said free end of the short arm against said other lever engaging surface and thereby turn the latch into a release position in which said hook is released from said latch.

In a preferred embodiment of the invention one of said lever engaging surfaces is formed on one side of the latch so as to be disposed below the short arm of the lever and the other side of the latch is formed with a hook engaging surface disposed below the inner end of the hook, whereby when the two-armed lever is turned in a direction to release the latch the hook engaging surface on the one side of the latch strikes upwardly against the lower surface of the inner end of the hook, thereby assisting the hook to drop around its pivotal mounting.

In the accompanying drawings which illustrate how the invention may be carried into effect:

Fig. 1 is an elevation and Fig. 2 a corresponding plan view of a hook made in accordance with the invention.

The hook 10 shown in the drawings is mounted in the usual way intermediate its ends on a pivot pin 11 mounted between two side plates 12, 13 from the ends of which the hook projects. The latch comprises a block 14 pivotally mounted on a second pivot pin 15 mounted between the side plates 12, 13 and shaped so that it can be brought to bear at the side 14' on the top surface 17 of the inner end of the hook. The extremities of the surfaces 14' and 17 of the latch and hook respectively are substantially in line with a radius through the pivot pin 15, and which is normal to these surfaces as shown in Figure 1, thus firmly holding the hook upright until the block 14 is tilted back. These surfaces when in engagement are parallel to the axis of pivot pin 15. The latch is operated by a two-armed lever comprising long and short arms 20, 21 respectively, the lever being pivotally mounted on a third pivot pin 22 mounted between upward extensions of the side plates so that the free end of the short arm 21 of the lever can be brought to bear on the lower surface $14^2$ of the side of the latch opposite to the side 14' which bears on the inner end of the hook. All these pivots are parallel. Spring washers 18 and 19 mounted on the pivot pin 22 between the lever and the side plates 12, 13 are accommodated in corresponding recesses in the side plates. The latch is formed with two side extensions $14^3$, $14^4$ extending respectively below the short lever arm 21 and the inner end of the hook. The two arms of the lever may be made separately and welded or otherwise secured together, a counter weight 23 being fixed or made integral with the lever arm 20. The top end of the latter is turned back at an angle of e.g. 45° and is formed with a slot 24 to receive a cable, rope or the like.

In the locking position (shown in the drawings) of the latch the long arm 20 of the lever is rearwardly inclined away from the hook 10 and the arrangement is such that the weight of the long arm, in the inclined position thereof, and of the counterweight produces a force which acts through the short lever arm 21 upwardly on the lower surface $14^2$ of the latch and forces the side 14' of the latter on to the top surface 17 of the inner end of the hook, thus retaining the latter in the locked position. In order to release the latch the long arm 20 of the lever is moved forwardly around its pivot thus releasing the locking force on the latch and allowing the hook to drop around its pivot and release the mooring rope or the like engaged therewith, the inner end of the hook rising and swinging the latch into an inoperative position.

The extension $14^3$ of the latch is arranged to be struck by the short arm 21 of the lever when the latter is operated to release the latch thereby positively rotating the latch into the inoperative position and causing the extension $14^4$ on the opposite side of the latch to move upwards against the lower surface of the inner end of the hook and thereby assist the hook to drop.

In order to operate the lever from a distance, for example from on board a moored ship, it is only necessary to engage one end of a wire, cable or the like in the slot 24 at the end of the long arm of the lever, the other end of the cable being in the operating station e.g. the moored ship.

A hook made in accordance with the present invention is thus very suitable for use as a mooring hook but it may also be used for other purposes, e.g. for attaching a towing or hauling rope or cable.

I claim:

1. A device for locking a pivotally mounted hook in operative position in which it is to be engaged by one end of a cable or like member and for subsequently releasing the lock to enable the hook to drop into a position in which it releases said cable or like member, said device comprising two horizontally spaced elongate side plates, three pivot pins connected between the side plates so as to extend there across in parallel spaced relationship longitudinally of the side plates, a hook, having outer and inner ends, pivotally mounted between said plates and between its ends on the pivot pin nearest one end of the plates with its outer or hooked end projecting from the side plates at said end substantially longitudinally of the elongate plates and tending to drop around its said pivot pin normal to said pin axis under the action of gravity, a locking and releasing latch pivotally mounted on the intermediate of said pivot pins and a two-armed lever having long and short arms pivotally mounted on the third of said pivot pins, the latch having a section extending from one side of its pivot pin, said section being notched on opposite sides, one notch facing the hook pivot pin and the other the lever pivot pin, the notch facing the hook pivot pin having one side facing and parallel to the latch pivot pin axis and substantially normal to and intersecting a plane through the axis of the latch pivot pin, said hook inner end being longer than the distance between the pivot pin centers of the hook and latch and at its extremity extending into the latch notch facing the hook pivot pin and having one side aligned with and engaging the pivot pin parallel notch side on the latch when in latch-hook locking position, lines in the aligned sides normal to the plane through the latch pivot pin axis being straight, and said latch-hook aligned engaging sides co-operating by their engagement in the locking position of said latch to restrain releasing movement of said hook, the short arm of said lever extending and being movable within the latch notch facing the lever pivot pin and means to urge the lever into latch locking position, the arrangement being such that on turning said lever in one direction the end of its short arm is pressed against one latch notch side in the notch facing the lever pivot pin to thereby turn said latch into and hold it in said locking position, whilst on turning said lever in the opposite direction the end of said short lever arm is pressed against the other latch notch side of said last named notch to thereby turn said latch into the release position in which said hook is released from said latch, whereupon said hook drops around its pivot pin into the release position.

2. A device according to claim 1 in which the long arm of said lever is inclined away from said latch, the weight of said long arm acting through the short lever arm to produce the retaining force exerted on said latch by said lever.

3. A device according to claim 1 in which a counterweight is fixed to the long arm of said lever, which is inclined away from said latch, the combined weight of said long arm and said counterweight acting through the short lever arm to produce the retaining force on said latch to hold the hook in operative position.

4. A device according to claim 1 in which means are provided for attaching to the free end of the long arm of said lever an operating cable or the like by means of which the lever can be operated from a distance to release the latch.

References Cited in the file of this patent

UNITED STATES PATENTS

| | | |
|---|---|---|
| 90,738 | Foster | June 1, 1869 |
| 1,368,647 | Myers | Feb. 15, 1921 |
| 1,377,159 | Spechtmeier | May 3, 1921 |
| 1,383,252 | Wearham | June 28, 1921 |
| 2,595,450 | Coffing | May 6, 1952 |